Nov. 8, 1938.　　A. H. J. DE L. ST. GENIES　　2,136,327
REPRODUCTION OF GOFFERED FILMS
Filed June 8, 1937　　3 Sheets-Sheet 2
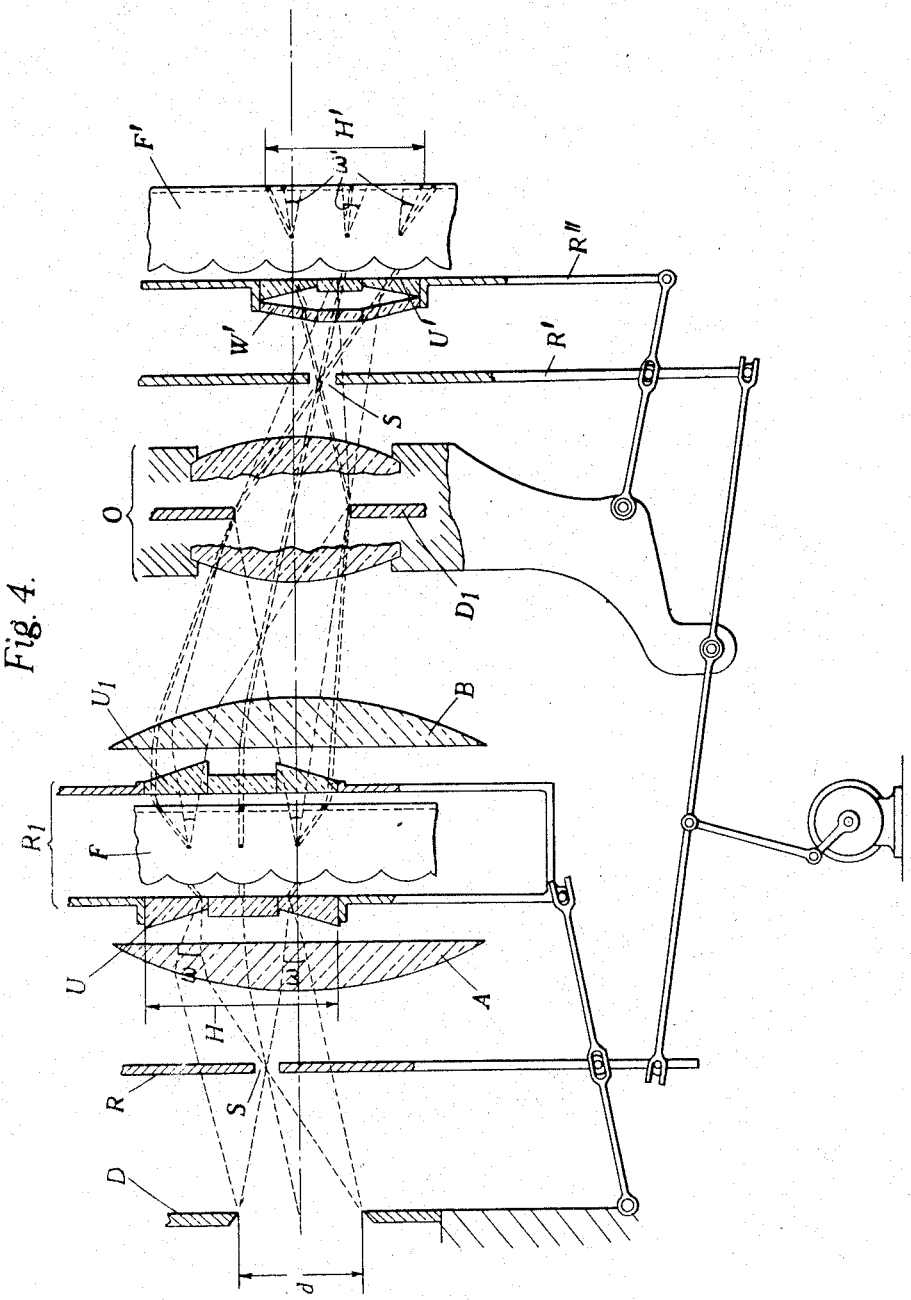

Nov. 8, 1938.  A. H. J. DE L. ST. GENIES  2,136,327
REPRODUCTION OF GOFFERED FILMS
Filed June 8, 1937   3 Sheets-Sheet 3
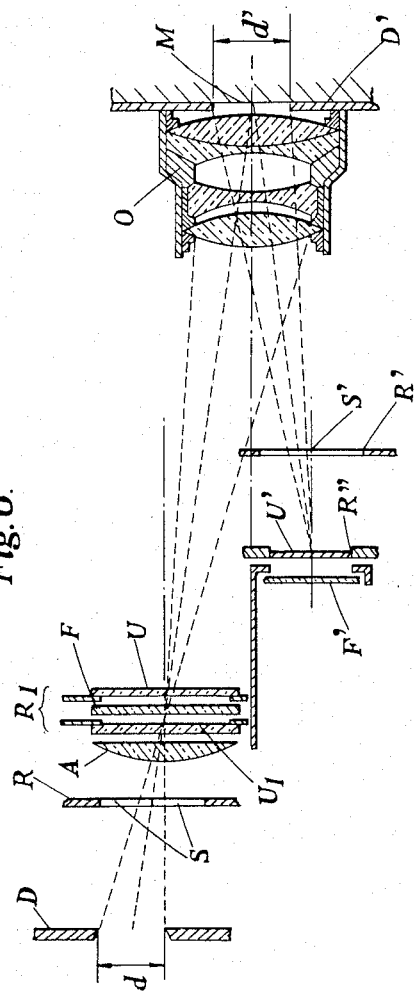
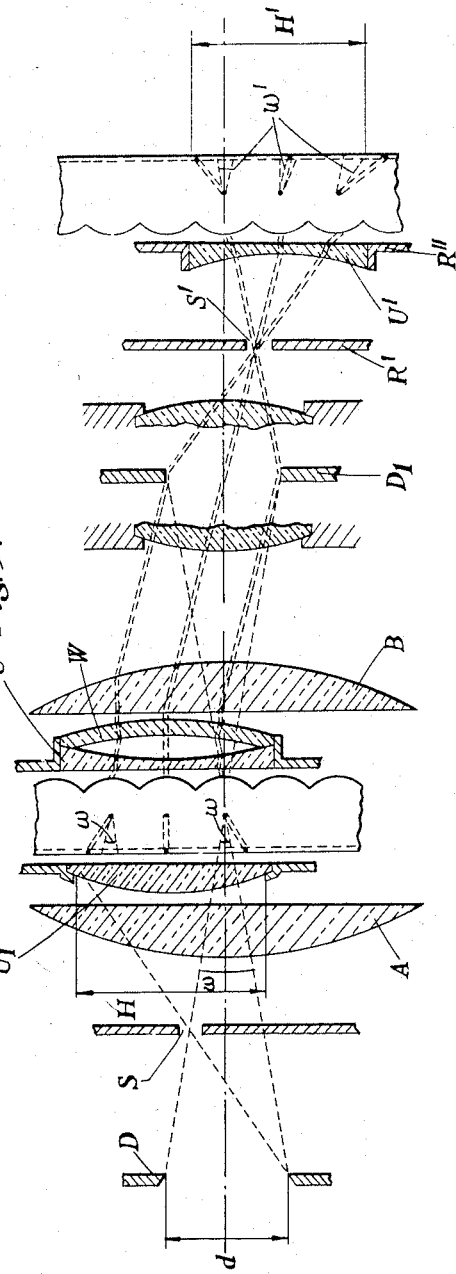
INVENTOR
Anne Henry Jacques
de Lassus Saint Genies
BY
Stone, Boyden & Mack
ATTORNEYS Patented Nov. 8, 1938

2,136,327

UNITED STATES PATENT OFFICE 2,136,327

REPRODUCTION OF GOFFERED FILMS

Anne Henri Jacques de Lassus St. Genies, Versailles, France

Application June 8, 1937, Serial No. 147,120
In France June 10, 1936

16 Claims. (Cl. 88—24)

The present invention relates to the copying by projection of goffered films.

It has already been proposed to employ, apart from copying optical systems and fixed additional lenses, movable additional lenses which are displaced in the vicinity of the original film and the copy film in order to transmit correctly to the latter all the useful luminous beams issuing from the original and to modify certain optical properties of the copy.

These movable additional lenses form the object of the co-pending application Serial No. 87,306 filed June 25, 1936.

According to the present invention, the movable additional optical systems, suitably arranged, are adapted to perform also certain new functions, such as the avoidance of the moires during copying and the strict positioning of the partial components of the image on the copy film.

The present description also indicates the conditions of use of such movable auxiliary optical systems on the side of the original film, which allows several advantages to be obtained: it is possible for example to employ, for copying, objectives which are less open, to render more independent than in the methods already proposed the relative apertures of the luminous cones of the two films and to facilitate the correct reproduction of the originals at any ratio of enlargement.

In the accompanying drawings attached by way of example,

Figure 3:
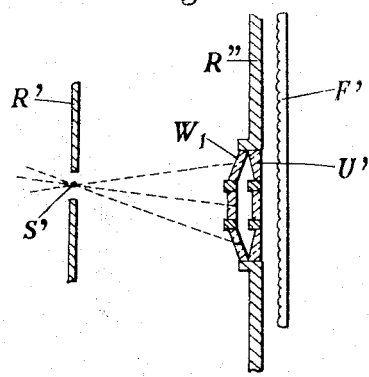

Fig. 3 indicates means peculiar to the present method for the strict positioning on the copy film of the partial components of the total image.

Figs. 4, 5 and 6 illustrate cases of application of the auxiliary optical systems movable in the vicinity of the original film and, if necessary, the copy film.

It is known that the recording of the moires may be avoided on the copy film if use is made of means which effect the displacement of the projected image of the goffering of the original on the goffering of the copy film by an amount ε approximate to the pitch of one of these networks. In the case where the gofferings are linear and parallel, the means usually employed, as is known, consists in interposing a glass having parallel faces and in imparting thereto a suitable oscillating movement.

According to the present invention, there is displaced adjacent to at least one of the films a glass, preferably cylindrical, of constant or practically constant thickness, its generatrices being parallel or substantially parallel to the direction of the gofferings.

Figure 1:
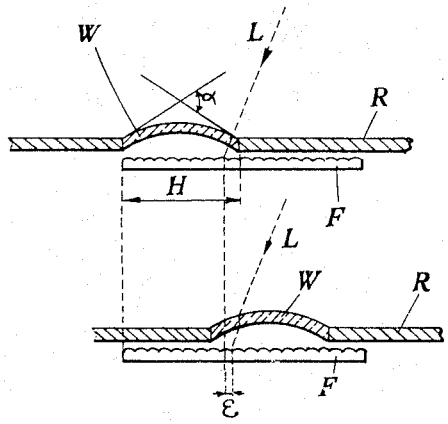
Fig. 1 illustrates in two diagrams a method of effacement of the moires with the aid of a cylindrical glass movable in front of the original or copy film, suitable for all methods of copying by projection of goffered films.

With reference to Fig. 1, it is seen that a glass W of this kind is mounted in the aperture of a movable screen R. It is seen that the desired effect may be obtained, for a given thickness and index of the glass W, if the planes tangent to the glass W, at the level of its terminal faces, form an angle α such that a luminous ray L of given direction ending at a point of the film, in traversing this lens, is displaced parallel to itself by the desired amount ε above defined, when this glass W inserted in the window of an opaque frame R is displaced itself by the whole of its width H relatively to the ray L under consideration. The total course of the lens W is, for example, at least equal to the width of the film plus H if the screen R is movable in the vicinity of the said film.

Figure 2:
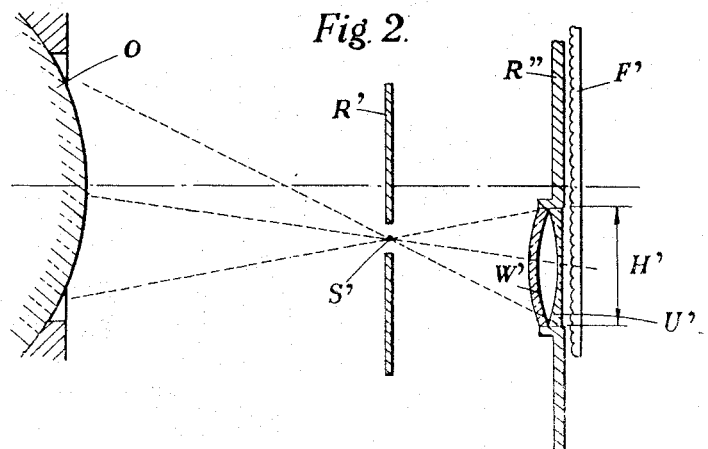
Fig. 2 illustrates an application of this method to a system of copying by projection.

Fig. 2 illustrates the practical application of this means. In this figure, O is the copying objective, F' the copy film, R' a movable screen having a slot S' which illuminates a zone H' of the film, and R'' another movable screen, the aperture of which coincides at any moment with this zone H'. Advantage may be taken of the arrangement of the movable screen R'' in front of the copy film F'' to mount in the window of this screen a cylindrical glass W' associated, if necessary, with a movable optical system U'. The thickness and the curvature of this glass W' should be calculated by reason of its index and of the width H' in order to produce the desired relative sliding of the image of the goffering of the original film not shown on the figure, and projected onto the film F''.

The optical system U', which may be a cylindrical divergent lens or an assembly of several prisms (see Fig. 3) has for object to open the elementary beams recorded on the copy film. This optical system U' may, for the same purpose, be constructed in the form of a spherical lens, as will be seen; in this case, the glass W' will preferably be a spherical segment.

In the applications of this kind, the glass W' suitably calculated may, according to the invention, fulfill another function which is added to that of the effacement of the moires. In the case, in effect, where use is made of an optical system U' and, above all, if this optical system moves at a non-negligible distance from the film F', it may happen that the construction of a certain point image on the film F' occupies at the surface of the film, positions which are too different when the different parts of the optical system U' pass in front of the film.

In the case for example, where, Fig. 3, the optical system U' comprises two prisms and a glass with parallel faces, it is seen that the image of all points may occupy three different positions at the surface of the film. If desired, these three images may be brought into strict coincidence by arranging in the same manner as the cylindrical glass of Figs. 1 and 2 three glasses $W_1$ having parallel faces and of certain thicknesses and index (see Fig. 3). The middle glass remains parallel to the middle glass of the system U' and is simply superadded to it. The two extreme glasses are each respectively inclined to the two prisms in such a manner that, measured on the film F', the sum of the translations which they impart to the beams of the rays arriving at each starting from S' and constructing a given image point is equal and opposite to the sum of the deviations of these images from this same point caused by the successive passage of the prisms.

In the case where the movable optical system U' is a cylindrical or spherical lens, as in Fig. 2, it is understood that this more or less strict adjustment of the partial components of the image projected on F' may be required from a cylindrical system W of constant thickness, or from a spherical segment also of constant thickness, provided that its curvature be calculated to this particular end.

Instead of strictly effecting this compensation of the displacements, it may be assured in an approximate manner by allowing an error to exist, which is equal to the pitch or to a sufficient portion of the pitch of one of the two networks superposed on the surface of the film F' as mentioned above; this permits of effacing the moires at the same time.

According to another modification, there may be combined with the optical systems U' a system W' comprising glasses with parallel faces for the adjustment of certain partial components only, and a cylindrical glass for the sole effacement of the moires. If, for example, in the case where the system U' is composed of prisms, there are three different systems of moires, three suitable cylindrical glasses will be provided, each opposite each of the three elements composing the system U', but if, in the same case, the dominant moires are those which proceed from the single central monochrome for example, there may be found sufficient for effacing them a cylindrical glass calculated to this end occupying only the width of the central parallel glass of the system U'.

Instead of applying these means on the side of the copy film, the effacement of the moires may also be effected by applying them to the original film. For example, as shown in Fig. 5, there may be arranged on the side of the original film F, in the vicinity of its face which is directed towards the principal copying objective O, a movable screen which carries along a cylindrical glass W of constant and suitably calculated thickness.

The correct positioning of the partial components on the copy may also be effected by the devices U and U' influencing respectively each of the two films; finally, the system W adjacent the original, which has just been mentioned, or the system W', arranged if necessary adjacent the copy, may be combined with systems U and U' in order to ensure at the same time the adjustment of the images and the effacement of the moires.

But such an application of the optical systems U adjacent the original allows of attaining at the same time another advantage of a different nature; it permits the use of copying objectives offering a relative aperture unequal to those of the elementary beams of the original.

In particular, three important consequences follow therefrom:

(a) There is very extensive freedom in choice of copying objectives both in their type and in their relative aperture and their focal length, (b) Copying at an enlargement very different from unitary enlargement is rendered possible in a novel way, (c) Finally, the different monochrome beams traverse all indistinctly the same central zone of the diaphragm of the copying objective.

Figs. 4, 5 and 6 illustrate the application of the invention to the reproduction of goffered originals with any enlargement with the aid of a copying objective of relative aperture less than those of the elementary beams of the original films. They also permit of obtaining the advantages enumerated above.

In these figures, D is a screen delimiting an active surface of a source of light of width $d$; this width is supposed to be less than that which would correspond to the correct illumination of the original film F. The principal objective O, in order to conform to the conditions of a correct copy, presents a diaphragm D', the aperture of which coincides with an image of the active surface $d$ of the source, this image being produced in the usual and known manner by the fixed auxiliary lenses A and B. Under these conditions, the relative aperture of O, seen from the film F, appears, as well as the active surface of the source, at an angle less than that which measures the aperture of the useful luminous cones of the film F.

In Fig. 4, the goffering of the film F has been assumed to be directed towards the light source: in Fig. 5, it is directed towards the principal objective O. In these figures, of the auxiliary lenses A and B, the lens which is generally necessary, is illustrated in full lines, and the lens which is optional is shown in dotted lines.

U is an auxiliary optical system comprising prisms or lenses and inserted in a frame or screen $R_1$ movable transversely to the goffering of F and occupying at any moment in close proximity to the film F and on the side of its goffering the position of the zone H illuminated by the active surface of the source $d$ and the rays of which are directed thereon by the slot S of a movable screen R.

The light source being too narrow to illuminate directly the lateral partial components of the film F, the movable optical system U of Fig. 4 has for object to ensure their correct illumination. In a manner similar to that which has been explained for the optical system U' movable in front of the copy film, this optical system U movable in front of the goffering of the original therefore produces, when viewed from the film F, an anamorphosis of the active surface of the source which is equivalent to an apparent enlargement (in time) of the aperture d, without modifying the distance at which the centre of the luminous source appears from the plane of the film.

Fig. 5. This optical system U, always placed in front of the goffering of F renders perceptible, at points of view taken in the interior of D' in the objective O, the lateral components of the film F which, without its intervention, would remain unperceived and therefore could not be transmitted to F'.

However, these movable optical systems U, if they were employed alone, would displace, as has been seen above, the image D' of D produced by the auxiliary system A—B. To compensate for this disturbance, a correcting system $U_1$, preferably equivalent to U and of opposite sign is rendered integral with U and with the screen or frame $R_1$ which displaces it, but situated in the vicinity of the other face of the film F in order not to annul the useful effect of U.

Another means than the correcting system $U_1$ may be employed. On the one hand, the auxiliary system A—B may be rendered more convergent than necessary, so that the combination A—B—U produces the correct construction D' of D when the principal axis of U passes through the principal axis of O; on the other hand, there may be taken into account the variable decentering of U, which involves the variable decentering of the image D' of the source, by animating the system A—B with a variable decentering movement, conjugated on that of U and of suitable amplitude for ensuring the stability of the image D' of D. When the goffering of F is turned towards the objective O, as in Fig. 5, it is the source d itself which it is possible, in preference to the system A—B, to animate with a suitable decentering movement.

On the copy side, it is always allowable to make use of optical systems U' for the purpose of acting on the aperture of elementary beams recorded on F'.

A mechanical means equivalent to the use of these optical systems U, U' and $U_1$ may again consist in bending the films, but only on the zones H and H' illuminated at any moment, according to a curvature situated in the planes orthogonal to their lenticulations. However, such means would be of a less simple application and, therefore, are less recommended than those described.

Fig. 6 illustrates by way of modification another application of the movable optical systems U and U' in combination with the movable slots S and S'. In this figure, the two films F and F' are illustrated in transverse section; it is assumed that one of the spools of each film is below the plane of the drawing and that the other spool is above this plane. It has also been assumed that the two films are goffered transversely. The principal copying optical system O intervenes for two opposite directions of the paths of the luminous rays, by the arrangement of a plane mirror M (or of a Mangin mirror specially provided to this end) close to the boss of this optical system O which is farther away from the two films F and F' placed on the same side. It is assumed that the slots S and S' are in the plane of the drawing; the optical system O is preferably of large focal length by reason of the decentering of both films.

The decentering of the light source illustrates, the active surface d of which light-source is delimited by the screen D, is possible due to the fact that the lenticulations of the two films are parallel to the plane of the drawing. In this case, the slots S and S' may be fixed and the films F and F' may move in a continuous manner perpendicularly to the plane of the drawing. A single common shaft may, for example, with two toothed drums of different diameters, in the case of cinematographic films of different size for example, ensure the correct displacements of the two films.

The decentering of the light source may also be avoided, whatever the direction of the lenticulation of the gofferings, by arranging prisms between the films and the optical system O in the vicinity of the films. According to another modification, the decenterings of the source D and of its image D' relatively to the two films will conform to the correct copy, if the elementary images on the two films may be considered as emitting or receiving light, not through the lenticular elements which normally concern them, but through one of the adjacent microscopic chambers. Finally, these decenterings may again correspond to equivalent decenterings of the colour filters both in view-taking and in projection.

In all the systems of copying described above, the application of the movable optical systems on the side of the original dispenses, if desired, with the narrowly defined delimitation and situation of the light source. In effect, just as S' and U' on the side of the copy are animated by a homothetic movement, the centre of similitude of which is the centre of the emergent pupil of the copying optical system O so the suitable homothetic movements imparted to S and U define a centre of similitude which necessarily plays the part of centre of the illuminating source. It is therefore sufficient that the active surface of the source should be sufficiently extensive, whatever its distance, in order that the illumination of the film shall be correct.

To effect the proper illumination of the original film the screen R (Figs. 4, 5 and 6) is arranged, as indicated in the aforesaid co-pending application, between the original film and the zone of convergence thereof. By zone of convergence is meant the plane, parallel to the film, in which is situated the point at which the axes of the elementary beams meet.

I claim:

1. In a system for copying goffered films by projection including movable screens having slots adapted to illuminate relatively narrow and parallel homologous parts of the two films, means for effacing the moires, comprising an additional movable screen adapted to be displaced adjacent at least one of the films, said movable screen having a window adapted to coincide with the illuminated part of the film, and a refractive element in said window for displacing the light rays parallel to themselves.

2. In a system for copying goffered films by projection including movable screens having slots adapted to illuminate relatively narrow and parallel homologous parts of the two films, means for effacing the moires, comprising an additional movable screen adapted to be displaced adjacent at least one of the films, said movable screen having a window adapted to coincide with the illuminated part of the film, and a refractive element in said window, said refractive element comprising a cylindrical segment.

3. In a system for copying goffered films by projection including movable screens having slots adapted to illuminate relatively narrow and parallel homologous parts of the two films, means for effacing the moires, comprising an additional movable screen adapted to be displaced adjacent at least one of the films, said movable screen having a window adapted to coincide with the illuminated part of the film, and a refractive element in said window, said refractive element comprising a plurality of plates with parallel faces and arranged at different inclinations.

4. In a system for copying goffered films by projection including movable screens having slots adapted to illuminate relatively narrow and parallel homologous parts of the two films, means for effacing the moires, comprising an additional movable screen adapted to be displaced adjacent at least one of the films, said movable screen having a window adapted to coincide with the illuminated part of the film, and a refractive element in said window for displacing the light rays parallel to themselves, and means for modifying the angular aperture of the luminous beams comprising a cylindrical lens also mounted in the window of said additional screen.

5. In a system for copying goffered films by projection including movable screens having slots adapted to illuminate relatively narrow and parallel homologous parts of the two films, means for effacing the moires, comprising an additional movable screen adapted to be displaced adjacent at least one of the films, said movable screen having a window adapted to coincide with the illuminated part of the film, and a refractive element in said window, said refractive element comprising a cylindrical segment, and means for modifying the angular aperture of the luminous beams comprising a cylindrical lens also mounted in said window of said additional screen.

6. In a system for copying goffered films by projection including movable screens having slots adapted to illuminate relatively narrow and parallel homologous parts of the two films, means for effacing the moires, comprising an additional movable screen adapted to be displaced adjacent at least one of the films, said movable screen having a window adapted to coincide with the illuminated part of the film, and a refractive element in said window, said refractive element comprising several plates with parallel faces and arranged at different inclinations, and means for modifying the angular aperture of the luminous beams comprising a cylindrical lens also mounted in said window of said additional screen.

7. In a system for copying goffered films by projection including movable screens having slots adapted to illuminate relatively narrow and parallel homologous parts of the two films, means for effacing the moires, comprising an additional movable screen adapted to be displaced adjacent at least one of the films, said movable screen having a window adapted to coincide with the illuminated part of the film, and a refractive element in said window, and means for modifying the angular aperture of the luminous beams comprising prisms with different angles associated with a glass plate having parallel faces, the said prisms and glass plate also being mounted in the window of the additional screen.

8. In a system for copying goffered films by projection including movable screens having slots adapted to illuminate relatively narrow and parallel homologous parts of the two films, means for effacing the moires, comprising an additional movable screen adapted to be displaced adjacent at least one of the films, said movable screen having a window adapted to coincide with the illuminated part of the film, and a refractive element in said window, said refractive element comprising a cylindrical segment, and means for modifying the angular aperture of the luminous beams comprising prisms with different angles associated with a glass plate having parallel faces, the said prism and glass plate also being mounted in the window of said additional screen.

9. In a system for copying goffered films by projection including movable screens having slots adapted to illuminate relatively narrow and parallel homologous parts of the two films, means for effacing the moires, comprising an additional movable screen adapted to be displaced adjacent at least one of the films, said movable screen having a window adapted to coincide with the illuminated part of the film, and a refractive element in said window said refractive element comprising a plurality of plates having parallel faces and arranged at different inclinations, and means for modifying the angular aperture of the luminous beams comprising prisms having different angles associated with a glass plate having parallel sides, the said prisms and glass plate also being mounted in the window of the additional screen.

10. In a system for copying goffered films by projection including movable screens having slots adapted to illuminate relatively narrow and parallel homologous parts of the two films, means for effacing the moires, comprising an additional movable screen adapted to be displaced in front of the goffering of the copy film, said movable screen having a window adapted to coincide with the illuminated part of said copy film, and a refractive element in said window for displacing the light rays parallel to themselves.

11. In a system for copying goffered films by projection including movable screens having slots adapted to illuminate relatively narrow and parallel homologous parts of the two films, means for effacing the moires, comprising an additional movable screen adapted to be displaced in front of the goffering of the copy film, said movable screen having a window adapted to coincide with the illuminated part of said copy film, and a refractive element in said window for displacing the light rays parallel to themselves, and means for modifying the aperture of the luminous beams comprising a refractive element also mounted in the window of said additional screen.

12. In a system for copying goffered films by projection including movable screens having slots adapted to illuminate relatively narrow and parallel homologous parts of the two films, means for effacing the moires, comprising additional movable screens adapted to be displaced on both sides of the original film and in front of the goffering of the copy film, said movable screens having windows adapted to coincide with the illuminated parts of said films, and refractive elements mounted in said windows.

13. System for copying goffered films by projection comprising a source of light, a diaphragm delimiting the useful surface of said source of light to such an extent that the same is insufficient to illuminate correctly the partial images of the original film, a movable screen having a narrow slot adapted to be displaced between said diaphragm and the original film so as to illuminate a relatively narrow part thereof, two additional movable screens one on each side of the original films, said additional screens each having a window coinciding with the illuminated part of the original film, an optical system in the window of each of said additional screens, two fixed lens one on each side of said original film, a copying objective having an aperture which is insufficient to transmit all the luminous beams emanating from the original film, a screen movable homothetically with respect to said first mentioned screen, said screen having a slot adapted to illuminate on the copy film a relatively narrow part homologous to the part illuminated on the original film, another additional screen adapted to be displaced in front of the copy film said screen having a window coinciding with the illuminated part thereof, and a refractive element in said window.

14. System for copying goffered films by projection comprising a copying objective including a device for reflecting light, an original film and a copy film, both having transverse gofferings, mounted on the same side of said objective, a screen having a fixed slot adapted to illuminate the original film, two screens one on each side of the original film, optical means mounted in said screens, a fixed screen having a slot adapted to illuminate the copy film, an additional screen in front of the copy film, and optical means in said additional screen.

15. In a system for copying goffered films by projection including movable screens having slots adapted to illuminate relatively narrow and parallel homologous parts of the two films, means for effacing the moires, comprising an additional movable screen adapted to be displaced adjacent at least one of the films, said movable screen having a relatively narrow window adapted to coincide with the illuminated part of the film, and a refractive element in said window for displacing the light rays parallel to themselves.

16. A system for copying goffered films by projection, comprising a source of light, a support for an original film, a support for a copy film, a principal optical system situated between said films, a pair of screens, one of said screens being situated between the original film and the zone of convergence of said original film, and the other of said screens being situated between said copy film and the principal optical system, said screens containing narrow windows parallel to one another and to the direction of the lenticulations of the original film, said films and said screen being displaced relatively to one another and the said windows remaining optically conjugated, whereby relatively narrow and homologous portions of the two films are simultaneously illuminated, and an additional movable screen adapted to be dsplaced adjacent at least one of the films, said movable screen having a relatively narrow window adapted to coincide with the illuminated part of the film, and a refractive element in said window for displacing the light rays parallel to themselves.

ANNE HENRI JACQUES DE
LASSUS ST. GENIES.